3,702,347
PARA-XYLENE RECOVERY AND PRODUCTION
George F. Adams, Tulsa, Okla., assignor to Universal
 Oil Products Company, Des Plaines, Ill.
Filed Nov. 9, 1970, Ser. No. 87,691
Int. Cl. C07c 7/12
U.S. Cl. 260—674 A                 12 Claims

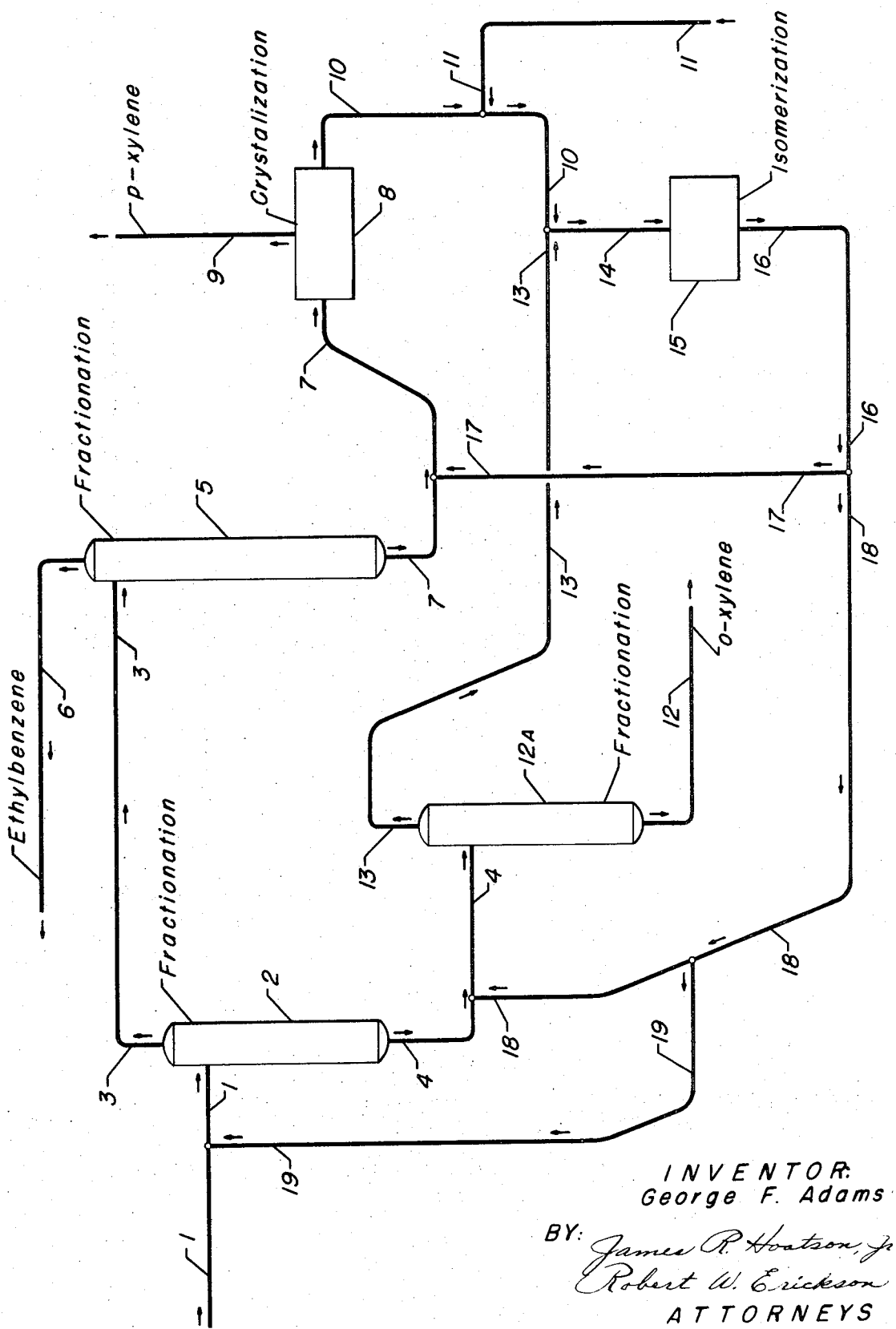

ABSTRACT OF THE DISCLOSURE

A process for the recovery of para-xylene from a $C_8$ aromatic mixture wherein the mixture is separated by fractional distillation to produce a relatively ortho-xylene-free, ethylbenzene, para-xylene and meta-xylene fraction and a relatively ethylbenzene-free ortho-xylene, meta-xylene and para-xylene fraction wherein the meta-xylene and para-xylene are present in a meta-xylene to para-xylene ratio of about 4:1 to about 7:1. The ethylbenzene fraction is separated by fractional distillation to produce a relatively pure ethyl-benzene overhead stream and a mixed meta-xylene-para-xylene bottoms stream. This meta-xylene-para-xylene containing bottoms stream is then separated by fractional crystallization to produce a relatively pure para-xylene product stream and a residual para-xylene-meta-xylene stream of approximately eutectic composition. Preferably, the residual para-xylene-meta-xylene stream and the mixed meta-xylene and para-xylene stream produced in the first fractionation are isomerized to produce additional quantities of para-xylene.

BACKGROUND OF THE INVENTION

This invention pertains to a process for the recovery of para-xylene. More particularly, the present invention pertains to a process for the recovery of para-xylene from a mixed xylene and ethylbenzene feedstock wherein the ethylbenzene and para-xylene are efficiently separated and the meta-xylene so recovered is isomerized to produce additional amounts of para-xylene.

Para-xylene, because of its concomitant utilization in the production of terephthalic acid, is the $C_8$ aromatic isomer currently in greatest demand. The other xylene isomers are also of some economic importance but are in lesser demand as chemical intermediates. Thus, while ortho-xylene has utility in the production of phthalic anhydride and meta-xylene has utility in the production of isophthalic acid, these isomers, and more particularly meta-xylene, are typically isomerized to produce additional amounts of the more desired para-xylene. Ethylbenzene may also be isomerized to produce para-xylene but since its isomerization is not as selective in the production of xylene isomers as meta-xylene and/or ortho-xylene isomerization, the ethylbenzene is often separately recoverd for further dehydrogenation to produce styrene.

Para-xylene is typically recovered from a $C_8$ aromatic feedstock derived from a petroleum refinery wherein all of the $C_8$ aromatic isomers are present, as a mixture, in varying quantities from which the para-xylene is not readily separated. For example, ortho-xylene is readily removed from a $C_8$ aromatic mixture by fractional distillation but since meta-xylene and para-xylene differ by only 0.7° C. in boiling point, complete separation of these two isomers by fractional distillation is not readily accomplished, rather, they must be separated by fractional crystallization or selective extraction (i.e., HF-$BF_3$ or molecular sieves). The most commonly encountered commercial technique for separating meta-xylene and para-xylene comprises fractional crystallization, a separation method well known to the art. Unfortunately, complete recovery of all the para-xylene in a given stream as a 100% purity para-xylene product is impossible by fractional crystallization because of the eutectic formed between meta-xylene and para-xylene. In fact, 98+% purity para-xylene can be produced from typically encountered refinery streams only by about a 60% para-xylene recovery per pass through the crystallization zone. Further, ethylbenzene differs from para-xylene by only 2.2° C. in boiling point thus rendering complete separation of these isomers by fractional distillation possible only by the employment of relatively expensive superfractionation techniques.

This ethylbenzene superfractionation typically comprises a fractionator of about 300 to 400 plates and employing a reflux ratio of between 50 and 250. The fractionation construction costs and operating cost parameters associated herewith vary only slightly within the composition range of the $C_8$ aromatic mixtures being typically processed. Thus, the size and cost of both building and operating a fractionation column for the separation of ethylbenzene and xylenes is almost directly proportional to the total quantity of feed passed to the ethylbenzene superfractionation column, regardless of the exact amounts of ethylbenzene in the typical feedstock. Consequently, the art strives for more economical and efficient methods for the recovery of para-xylene from a $C_8$ aromatic mixture, particularly methods for lowering and eliminating fractionation and crystallization costs.

SUMMARY OF THE INVENTION

It is an object of the present invention to provide a novel sequence of operation that will separate the three xylene isomers and ethylbenzene in an economic manner using the conventional techniques of fractionation and crystallization arranged in a novel processing sequence that permits the separation of the $C_8$ aromatic compounds to be made at a cost lower than that possible by present production techniques. Essentially, the process of the present invention recognizes that meta-xylene and para-xylene are separable to some degree by fractionation. Thus, in a fractionation operation that serves to concentrate the ethylbenzene contained in a mixed $C_8$ aromatic feedstock while at the same time making a partial separation between para-xylene and meta-xylene, there is allowed a significant reduction in the overall cost of the separation steps needed for the recovery of para-xylene.

In an embodiment, therefore, the present invention relates to a process for the recovery of para-xylene from a $C_8$ aromatic feedstock comprising ethylbenzene, ortho-xylene, meta-xylene and para-xylene which comprises first separating, by fractional distillation, said feedstock to produce a relatively ortho-xylene-free, ethylbenzene, para-xylene and meta-xylene containing fraction and a relatively ethylbenzene-free, ortho-xylene, meta-xylene and para-xylene fraction wherein the meta-xylene and para-xylene are present in a meta-xylene to para-xylene ratio of about 4:1 to about 7:1. The ethylbenzene rich fraction is then separated by fractional distillation to produce a relatively pure ethylbenzene overhead stream and a meta-xylene-para-xylene bottoms stream. This bottoms stream is then separated by fractional crystallization techniques to produce a relatively pure para-xylene product stream and a residual, mixed para-xylene-meta-xylene stream of approximately eutectic composition. Preferably, the ratio of meta-xylene to para-xylene both in the ethylbenzene-free fraction so produced and in the residual crystallization step stream is about 6:1. At least a portion of this residual stream produced in the fractional crystallization and/or at least a portion of the ethylbenzene-free, meta-xylene-para-xylene fraction produced is contacted with an isomerization catalyst at isomerization conditions to produce an ortho-xylene, meta-xylene and para-xylene isomerization reaction mixture having an approximately thermodynamic equilibrium composition. This reaction mixture so produced is then separated either by fractional crystallization techniques or in conjunction with the original $C_8$ aromatic feedstock.

In a more limited embodiment, the present invention relates to a process for the recovery of para-xylene and ortho-xylene from a $C_8$ aromatic feedstock comprising ethylbenzene, ortho-xylene, meta-xylene and para-xylene by first separating, by fractional distillation, the $C_8$ aromatic feedstock to produce a relatively ortho-xylene-free ethylbenzene, para-xylene and meta-xylene fraction, a relatively pure ortho-xylene product fraction and a relatively ethylbenzene-free, meta-xylene and para-xylene fraction wherein the meta-xylene and para-xylene are present in a meta-xylene to para-xylene ratio from about 4:1 to about 7:1. Preferably, this fractional distillation comprises first fractionating said $C_8$ aromatic feedstock to produce a relatively ortho-xylene-free, ethylbenzene, para-xylene and meta-xylene overhead fraction and a relatively ethylbenzene-free, ortho-xylene, meta-xylene and para-xylene bottoms fraction, said bottoms fraction then being fractionated to produce said ortho-xylene product stream as a bottoms fraction and said meta-xylene and para-xylene fraction as an overhead fraction. The ethylbenzene containing fraction is separated by fractional distillation to produce a relatively pure ethylbenzene overhead stream and a meta-xylene-para-xylene bottoms stream. This bottoms stream is then separated by fractional crystallization to produce a relatively pure para-xylene product stream and a residual para-xylene-meta-xylene stream of approximately eutectic composition. Preferably, this residual crystallization stream and the meta-xylene and para-xylene fraction produced in the fractional distillation have a mole ratio of meta-xylene to para-xylene of about 6:1. Further, at least a portion of this crystallization residue stream and a portion of the ethylbenzene-free fraction containing meta-xylene and para-xylene are contacted with isomerization catalyst at isomerization conditions to produce an ortho-xylene, meta-xylene and para-xylene isomerization reaction mixture having an approximately thermodynamic equilibrium composition. This isomerization reaction mixture is then separated either in conjunction with the $C_8$ aromatic feedstock passed to the process of the present invention and/or in conjunction with the stream passed to the para-xylene crystallization step of the process of the present invention.

Thus, by combining the known techniques of fractional distillation to produce a meta-xylene-para-xylene mixture of approximately the same composition as the eutectic composition of a meta-xylene-para-xylene mixture produced in a para-xylene crystallization step, the techniques of fractional distillation are combined with the known techniques of fractional crystallization to produce a para-xylene product in a heretofore unrecognized, more economical manner. Other objects and embodiments and a more detailed description of the foregoing preferred embodiments will be found in the following detailed description of the process of the present invention.

DESCRIPTION OF PREFERRED EMBODIMENTS $C_8$ aromatic feedstocks comprising ortho-xylene, meta-xylene, para-xylene and ethylbenzene are readily available from both petroleum and coal sources in a manner well known to those trained in the art. A preferred source is from a reformate produced from a typical hydrogen reforming process wherein a 200 to about 400° F. boiling range naphtha is reformed with a supported platinum-halogen catalyst. The $C_8$ aromatics produced and ultimately recovered from such processes are typically present in nonequilibrium amounts with the exact composition varying from about 5 to about 35% (mole) ethylbenzene, 10 to about 24% para-xylene, 40 to about 60% meta-xylene and about 5 to about 25% ortho-xylene, with commonly 1 to 2% toluene and/or benzene being present. If the para-xylene content of the $C_8$ aromatics recovered from a catalytic reformate is depleted in para-xylene content (i.e., less than about 10% para-xylene content) the $C_8$ aromatics which are recovered may be first isomerized to produce a $C_8$ aromatic feedstock having a para-xylene content of at least 20 wt. percent, based on xylenes present.

As previously indicated, in a broad embodiment, according to the process of the present invention, a $C_8$ aromatic feedstock either of the type indicated or a feedstock as produced in a $C_8$ aromatic isomerization process, is first separated by fractional distillation to produce a relatively ortho-xylene-free, ethylbenzene, para-xylene and meta-xylene containing overhead fraction and a relatively ethylbenzene-free, ortho-xylene, meta-xylene and para-xylene containing bottoms fraction wherein the meta-xylene and para-xylene are present in a meta-xylene to para-xylene ratio of about 4:1 to about 7:1. Preferred are ethylbenzene concentrations in the bottoms fraction of about less than 5%, and in particular less than 2%. The ortho-xylene concentration in the overhead is preferably maintained below about 5%. In addition the meta-xylene-para-xylene ratio in the ethylbenzene fraction is preferably about 6:1, namely the approximate composition of a meta-xylene-para-xylene eutectic mixture. In a situation where there is utilized a typical $C_8$ aromatic feedstock, about 60 to about 70% of the para-xylene is recovered overhead. This foregoing fractionation of the $C_8$ aromatic feedstock is effected in a manner well known to those trained in the art by employing either a single fractionation column or a series of two or more fractionation columns. This column (or columns) typically have a total of about 50 to about 300 plates and employ a reflux ratio of about 2:1 to about 40:1.

The relatively ortho-xylene-free, ethylbenzene, para-xylene and meta-xylene containing overhead fraction is then further separated by fractional distillation to produce a relatively pure ethylbenzene overhead stream and a meta-xylene-para-xylene containing bottoms stream. This fractional distillation is preformed by conventional distillation techniques well known to those trained in the art and of a type necessary to produce a relatively pure ethylbenzene stream, preferably of about 98% ethylbenzene purity. Preferably the ethylbenzene concentration in the mixed meta-xylene-para-xylene bottoms is less than about 2%. This separation is readily effected by conventional ethylbenzene fractionation techniques in a column of about 100 to 400 plates and employing a reflux ratio of about 50:1 to about 200:1 or more correlated to produce the desired, relatively pure ethylbenzene product stream as an overhead fraction. By first fractionating the $C_8$ aromatic feedstock to produce a concentrate of ethylbenzene in the overhead product, the size and cost of the latter, ethylbenzene superfractionation column utilized to produce the ethylbenzene product stream is greatly reduced. Since the size and operating cost of this superfractionation tower is roughly proportional to the total feed to the tower, in a typical situation utilizing a typical $C_8$ aromatic feedstock, the feed rate and attendant costs associated with building and operating this tower are reduced by up to about 50%.

The mixed para-xylene-meta-xylene containing bottoms stream so recovered is then separated by fractional crystallization to produce a relatively pure para-xylene product stream and a residual para-xylene-meta-xylene stream of approximately eutectic composition. Complete recovery of all the para-xylene contained in the feed to a conventional commercial fractional crystallization unit is impossible because the solid eutectic mixture formed between the para-xylene and meta-xylene varies from about 14% para-xylene to about 9% para-xylene depending upon the diluents which may be present. While various extraneous diluents have been proposed for utilization in conventional crystallization units by changing either the eutectic composition or delaying its formation, such diluents have not found extensive commercial utilization. Other hydrocarbons which remain in the mixture serve also as diluents, thus reducing the para-xylene content of the eutectic, but all diluents lower the freezing point of the eutectic, thus requiring additional refrigeration if the potentially higher recovery is to be attained. In conventional crystallization units only about 50 to 60% of the para-xylene is recovered economically.

In a typical commercial crystallization process, a $C_8$ aromatic stream, preferably containing about 15 to 20% para-xylene, is first cooled to about −40° C. and is then further cooled by further heat exchange with a scraped internal surface kept at about −70° C. by external cooling, preferably with boiling ethylene. A slurry of para-xylene crystals is thus formed and passes into a holding tank from which the slurry is centrifuged, either batchwise or continuously, by a basket type centrifuge with a scraping knife automatically rising to cut the retained crystals from the centrifuge basket and drawing these recovered crystals to a melting tank. The depleted mother liquor is then drawn off and may be used as a cooling medium in the crystallization process.

The raw crystals recovered from the centrifuge typically contain about 80% para-xylene and are further processed by melting and recrystallization to at least 95% purity and preferably of at least 98% purity. The design and operation of these recrystallization units are similar to that utilized in the first crystallization unit with the chief differences being that the second crystallization unit (recrystallization unit) employs a scraped chiller hold at about −18° C. utilizing propane as a refrigerant, and that the depleted mother liquor, recovered from the recrystallization unit and containing typically about 45% para-xylene, is recycled to the first stage of the crystallization unit. By utilizing the process of the present invention, this foregoing described para-xylene crystallization unit will be greatly reduced in size because the removal of the meta-xylene rich stream in the first fractionation tower lowers the total feed to such crystallization unit, thus reducing the capacity and refrigeration requirements of the units. Recovery of para-xylene in the overall process will not be decreased since the meta-xylene rich product removed as bottoms from the distillation tower will not contain any more para-xylene than would be contained if the total meta-xylene and the para-xylene containing $C_8$ aromatic feedstock were processed in the crystallization unit and ultimately removed as a eutectic mixture. Thus the total saving in the size of the ethylbenzene tower and the crystallization unit will be greater than the added cost necessary for the additional fractionation unit as utilized in the process of the present invention.

In a preferred embodiment, at least a portion of the residual eutectic stream recovered from the crystallization step and/or at least a portion of the ethylbenzene-free fraction recovered from the first fractionation step are contacted with an isomerization catalyst at isomerization conditions to produce an ortho-xylene-meta-xylene-para-xylene isomerization reaction mixture having an approximately thermodynamic equilibrium composition. It is by using this preferred embodiment that further amounts of para-xylene are produced by the process of the present invention.

This xylene iomerization is readily effected by any means well known to those trained in the art since no novelty is asserted herein as to the exact methods, conditions and catalyst system to be utilized for the isomerization of the xylenes to produce further amounts of para-xylene. Thus, well known catalystic systems utilizing isomerization catalyst such as aluminum chloride, hydrogen fluoride, hydrogen fluoride·boron trifluoride complexes and acidic refractory inorganic oxides such as the hydrogen form of the zeolitic crystalline aluminosilicates, silica-alumina, halogenated aluminas and the isomerization conditions associated therewith are included with the scope of the present invention. Particularly preferred isomerization catalysts for isomerization of xylenes employ a hydrogenation-dehydrogenation component combined with an acidic refractory inorganic oxide support. Preferred refractory inorganic oxide supports include aluminas containing about 0.1 to about 10 wt. percent fluorine and/or chlorine, silica-alumina, the hydrogen forms of faujasite or mordenite and combinations of alumina and faujasite or mordenite. Suitable hydrogenation-dehydrogenation components include metals of Group I–B, VI–B, and VIII of the Periodic Table of Elements, namely, the elements copper, gold, silver, iron, cobalt, nickel, ruthenium, rhodium, palladium, osmium, iridium, platinum, chromium molybdenum and tungsten (wolfram). Particularly preferred are platinum and/or palladium. A particularly preferred catalytic composite comprises about 0.1 to about 2 wt. percent platinum and about 0.1 to about 5 wt. percent fluorine and/or chorine combined with a gamma-alumina carrier material.

Suitable isomerization conditions when utilizing the preferred acidic refractory inorganic oxide catalysts include a temperature of about 200° C. to about 650° C., particularly about 350° C. to about 550° C., pressures of about atmospheric to about 100 atmospheres and liquid hourly space velocities (LHSV) of about 0.1 hr.$^{-1}$ to about 10 hrs.$^{-1}$. Preferably, the xylenes are commingled with hydrogen at a hydrogen to hydrocarbon mole ratio of about 0.5:1 to about 20:1 to avoid excessive deactivation of the hydrogenation-dehydrogenation component of the catalyst. This isomerization reaction utilizing refractory inorganic oxide type catalysts is effected in an isomerization zone wherein the catalyst is utilized either as a fixed bed or moving bed system with the xylenes being contacted with the catalyst in an upflow, downflow or radial flow patterns. Preferred is a fixed-bed, vapor-phase, downflow system.

By utilizing the foregoing, well known isomerization catalysts and conditions, a reaction mixture having an approximately thermodynamic xylene equilibrium composition is produced. In addition, small amounts of benzene, toluene, paraffins, naphthenes and $C_9$ aromatics may be formed. The $C_7^-$ and $C_9^+$ hydrocarbons so produced are readily removed from the total process of the present invention by fractional distillation with the $C_8$ aromatic isomerization reaction mixture being separated, either in the fractional crystallization zone in conjunction with the bottoms stream recovered from the ethylbenzene fractionation column or, more preferably, at least a portion of said isomerization mixture is separated in the first fractionation zone in conjunction with the $C_8$ aromatic feedstock first passed to the process of the invention.

The process of the present invention may also be utilized for the simultaneous recovery of both para-xylene and ortho-xylene from a $C_8$ aromatic feedstock comprising ethylbenzene, ortho-xylene, meta-xylene, and para-xylene by first separating, by fractional distillation, the $C_8$ aromatic feedstock to produce a relatively ortho-xylene-free, ethylbenzene, para-xylene and meta-xylene containing fraction, a relatively pure ortho-xylene product fraction and a relatively ethylbenzene-free, meta-xylene and para-xylene containing fraction wherein the meta-xylene and para-xylene are present in a meta-xylene to para-xylene ratio of about 4:1 to about 7:1. Preferably, the meta-xylene to para-xylene ratio in this fraction is about 6:1. While this fractional distillation may be performed in a single fractionation column wherein the ethylbenzene rich fraction is recovered overhead, the ortho-xylene product fractions is recovered as bottoms and the mixed meta-xylene and para-xylene fraction is recovered as an intermediate fraction, a preferred mode for effecting the fractional distillation comprises first fractionating said $C_8$ aromatic feedstock to produce a relatively ortho-xylene-free, ethylbenzene, para-xylene and meta-xylene overhead fraction and a relatively ethylbenene-free, ortho-xylene, meta-xylene and para-xylene bottoms fraction. This bottoms fraction is then further fractionated to produce the ortho-xylene product fraction as a bottoms fraction and the meta-xylene and para-xylene fraction as an overhead fraction.

In any event the ethylbenzene fraction, relatively free of ortho-xylene is then separated by fractional distillation to produce a relatively pure ethylbenzene overhead stream as a product and a mixed meta-xylene-para-xylene bottoms stream. Either of these foregoing fractionations readily accomplished by those well trained in the art of fractional distillation, with the separation of the $C_8$ aromatic feedstock by a dual fractionation technique being the preferred mode of operation. The mixed meta-xylene, para-xylene bottoms stream produced in the ethylbenzene fractionation is then separated by the hereinbefore described fractional crystallization techniques to produce a relatively pure para-xylene product stream and a residual para-xylene-meta-xylene stream of approximately eutectic composition.

As previously described at least a portion of the residual eutectic stream produced in the para-xylene crystallization and/or at least a portion of the intermediate fraction containing the meta-xylene and para-xylene mixture as produced in the initial fractionation are contacted with an isomerization catalyst at isomerization conditions to produce an ortho-xylene, meta-xylene and para-xylene isomerization reaction mixture having an approximate thermodynamic equilibrium composition. Depending somewhat on the exact total amounts of para-xylene and ortho-xylene to be produced according to the process of the present invention, this reaction mixture is separated either in conjunction with the ethylbenzene fractionation bottoms stream as passed to the para-xylene crystallizer, or in conjunction with the $C_8$ aromatic feedstock passed to the process of the present invention in the initial fractionation. Alternatively when the initial fractionation is a two stage fractionation, namely a relatively ethylbenzene-free, ortho-xylene, meta-xylene and para-xylene bottoms fraction is first produced, at least a portion of the isomerization reaction mixture can then be separated in conjunction with the bottoms stream produced in the described initial fractionation. Any $C_9^+$ aromatics produced in the isomerization step of the present invention are readily removed by further fractionation of the ortho-xylene bottoms stream.

DESCRIPTION OF THE DRAWING

The process of the present invention can be most clearly described by reference to the attached drawing schematically illustrating the production of para-xylene and ortho-xylene from a mixed $C_8$ aromatic feedstock. Of necessity, certain limitations must be present in a schematic diagram of the type presented, and no intention is made thereby to limit the scope of this invention to reactants, rates, operating conditions, catalysts, etc. Miscellaneous appurtenances including valves, pumps, compressors, separators, reboilers, etc., have been eliminated. Only those vessels and lines necessary for a complete and clear understanding of the process of the present invention are presented with any modifications made by those possessing expertise in the art of alkylaromatic isomerization and recovery being included within the broad scope of the present invention.

Referring to the attached schematic diagram, a $C_8$ aromatic feedstock, containing 140 units of ethylbenzene (moles per hour), 230 units of ortho-xylene, 510 units of meta-xylene and 210 units of para-xylene is passed via line 1 to fractionation column 2 which is of conventional design. Within fractionation column 2, an ethylbenzene, para-xylene and meta-xylene mixture relatively free of ortho-xylene, and in particular containing 139 units of ethylbenzene, 160 units of para-xylene, 210 units of meta-xylene and about 1 unit of ortho-xylene are removed overhead from fractionation column 2 via line 3 and passed to fractionation column 5. Fractionation column 2 is a conventional fractionation column containing about 100 to 300 plates and employing a reflux ratio of about 2:1 to about 50:1 or more.

Within fractionation column 5, fractionation column 2 overhead is separated into an ethylbenzene product stream removed via line 6 and containing 130 units of ethylbenzene and about 1 unit each of para-xylene and meta-xylene and a mixed meta-xylene-para-xylene bottoms stream removed via line 7 and containing 1 unit of ortho-xylene, 209 units of meta-xylene, 159 units of para-xylene and about 9 units of ethylbenzene.

This mixed meta-xylene-para-xylene stream recovered as bottoms from fractionation column 5 is passed via line 7 to para-xylene crystallization zone 8 wherefrom a relatively pure para-xylene product stream containing 124 units of para-xylene and about 1 unit of meta-xylene is removed via line 9 and a residual xylene mixture containing 208 units of meta-xylene, 35 units of para-xylene, 9 units of ethylbenzene and 1 unit of ortho-xylene is removed via line 10.

Removed as bottoms from fractionation column 2 is a relatively ethylbenzene-free, ortho-xylene, para-xylene and meta-xylene stream containing 229 units or ortho-xylene, 50 units of para-xylene, 300 units of meta-xylene and about 1 unit of ethylbenzene. This stream is removed via line 4 and passed to fractionation column 12A. Within fractionation column 12A there is removed therefrom an ortho-xylene product stream via line 12, containing 224 units of ortho-xylene, about 8 units of meta-xylene and about 1 unit of para-xylene. Removed as overhead from fractionation column 12A via line 13, is a mixed para-xylene-meta-xylene stream of approximately the same meta-xylene-para-xylene ratio as the residual eutectic mixture removed from crystallization zone 8 via line 10. More precisely, line 13 contains 5 units or ortho-xylene, 49 units of para-xylene and 292 units of meta-xylene, and about 1 unit of ethylbenzene.

To effect additional production of both para-xylene and ortho-xylene, the mixed meta-xylene-para-xylene stream removed from fractionation column 12A via line 13 and the crystallization mother liquor removed via line 10 are combined in line 14 and passed to isomerization zone 15 wherein additional amounts of otho-xylene an para-xylene are produced. Alternatively, a $C_8$ aromatic feedstock containing less than about 10 to 15% para-xylene may be introduced to the process of the present invention via lines 11 and 10 and passed to isomerization zone 15 via line 14 to upgrade the para-xylen content of this stream. Produced within isomerization zone 15 is a mixed xylene mixture containing approximately equilibrium amounts ortho-xylene, meta-xylene and para-xylene and which is removed via line 16. Depending somewhat on the overall amounts of ortho-xylene and para-xylene to be produced according to the process of the present invention, isomerization zone effluent 16 may be separated by either passing at least a portion thereof via line 17 to crystallization zone 8 to recover additional amounts of para-xylene or it may be passed via line 18 to fractionation column 12A to recover additional amounts of ortho-xylene. Alternatively, additional amounts of both para-xylene and ortho-xylene may be recovered by passing at least a portion of the isomerization reaction effluent via line 19 to combine with feedstream 1 for separation in fractionation column 2.

I claim as my invention:

1. A process for the recovery of para-xylene from a $C_8$ aromatic feedstock comprising ethylbenzene, ortho-xylene, meta-xylene and para-xylene which comprises the steps of:
  (a) separating, by fractional distillation, said feedstock to produce a relatively ortho-xylene-free, ethylbenzene, para-xylene and meta-xylene containing fraction and a relatively ethylbenzene-free, ortho-xylene, meta-xylene and para-xylene containing fraction wherein the meta-xylene and para-xylene are present in a meta-xylene to para-xylene ratio of about 4:1 to about 7:1;
  (b) separating, by fractional distillation, said ethylbenzene fraction to produce a relatively pure ethylbenzene overhead stream and a meta-xylene-para-xylene bottoms stream; and, (c) separating, by fractional crystallization, said bottoms stream, to produce a relatively pure para-xylene product stream and a residual para-xylene-meta-xylene stream of approximately eutectic composition.

2. The process of claim 1 wherein the ratio of meta-xylene to para-xylene in the ethylbenzene free fraction of step (a) and the residual stream of step (c) is about 6:1.

3. The process of claim 1 wherein at least a portion of the residual stream of step (c) and at least a portion of the ethylbenzene-free fraction of step (a) are commingled and the mixture contacted with an isomerization catalyst at isomerization conditions to produce an ortho-xylene, meta-xylene and para-xylene isomerization reaction mixture having an approximately thermodynamic equilibrium composition.

4. The process of claim 3 wherein at least a portion of said reaction mixture is separated in step (c) in conjunction with the bottoms stream of step (b).

5. The process of claim 3 wherein at least a portion of said reaction mixture is separated in step (a) in conjunction with the $C_8$ aromatic feedstock.

6. A process for the recovery of para-xylene and ortho-xylene from a $C_8$ aromatic feedstock comprising ethylbenzene, ortho-xylene, meta-xylene and para-xylene which comprises the steps of:

(a) separating, by fractional distillation, said feedstock to produce a relatively ortho-xylene-free, ethylbenzene, para-xylene and meta-xylene containing fraction, a relatively pure ortho-xylene product fraction and a relatively ethylbenzene-free, meta-xylene and para-xylene containing fraction wherein the meta-xylene and para-xylene are present in a meta-xylene to para-xylene ratio of about 4:1 to about 7:1.

(b) separating, by fractional distillation, said ethylbenzene fraction to produce a relatively pure ethylbenzene overhead stream and a meta-xylene-para-xylene bottoms stream; and, (c) separating, by fractional crystallization, said bottoms stream to produce a relatively pure para-xylene product stream and a residual para-xylene-meta-xylene stream of approximately eutectic composition.

7. The process of claim 6 wherein said fractional distillation of step (a) comprises first fractionating said feedstock to produce a relatively ortho-xylene-free, ethylbenzene, para-xylene and meta-xylene overhead fraction and a relatively ethylbenzene-free, ortho-xylene, meta-xylene and para-xylene bottoms fraction, said bottoms fraction being then fractionated to produce said ortho-xylene product fraction as a bottoms fraction, and said meta-xylene and para-xylene fraction as an overhead fraction.

8. The process of claim 6 wherein the ratio of meta-xylene to para-xylene in the ethylbenzene-free fraction of step (a) and the residual stream of step (c) is about 6:1.

9. The process of claim 6 wherein at least a portion of the residual stream of step (c) and at least a portion of the ethylbenzene free fraction of step (a) are commingled and the mixture contacted with an isomerization catalyst at isomerization conditions to produce an ortho-xylene, meta-xylene, and para-xylene isomerization reaction mixture having an approximately thermodynamic equilibrium composition.

10. The process of claim 9 wherein at least a portion of said reaction mixture is separated in step (c) in conjunction with the bottoms stream of step (b).

11. The process of claim 9 wherein at least a portion of said mixture is separated in step (a) in conjunction with the $C_8$ aromatic feedstock.

12. The process of claim 9 wherein said fractional distillation of step (a) comprises first fractionating said feedstock to produce a relatively ortho-xylene-free, ethylbenzene, para-xylene and meta-xylene overhead fraction and a relatively ethylbenzene-free ortho-xylene, meta-xylene and para-xylene bottoms fraction, said bottoms fraction being then fractionated in conjunction with said isomerization reaction mixture to produce said ortho-xylene product fraction as a bottoms fraction and said meta-xylene and para-xylene fraction as an overhead fraction.

References Cited

UNITED STATES PATENTS

| 2,532,276 | 12/1950 | Birch et al. | 260—668 |
| 3,067,270 | 12/1962 | Weedman | 260—674 |
| 3,522,153 | 7/1970 | King | 260—674 |
| 3,254,024 | 5/1966 | Huckins et al. | 260—674 |
| 3,584,068 | 6/1971 | Jackson et al. | 260—674 |

DELBERT E. GANTZ, Primary Examiner

C. E. SPRESSER, JR., Assistant Examiner

U.S. Cl. X.R.

203—48; 208—354; 260—668 A